Figure 1:
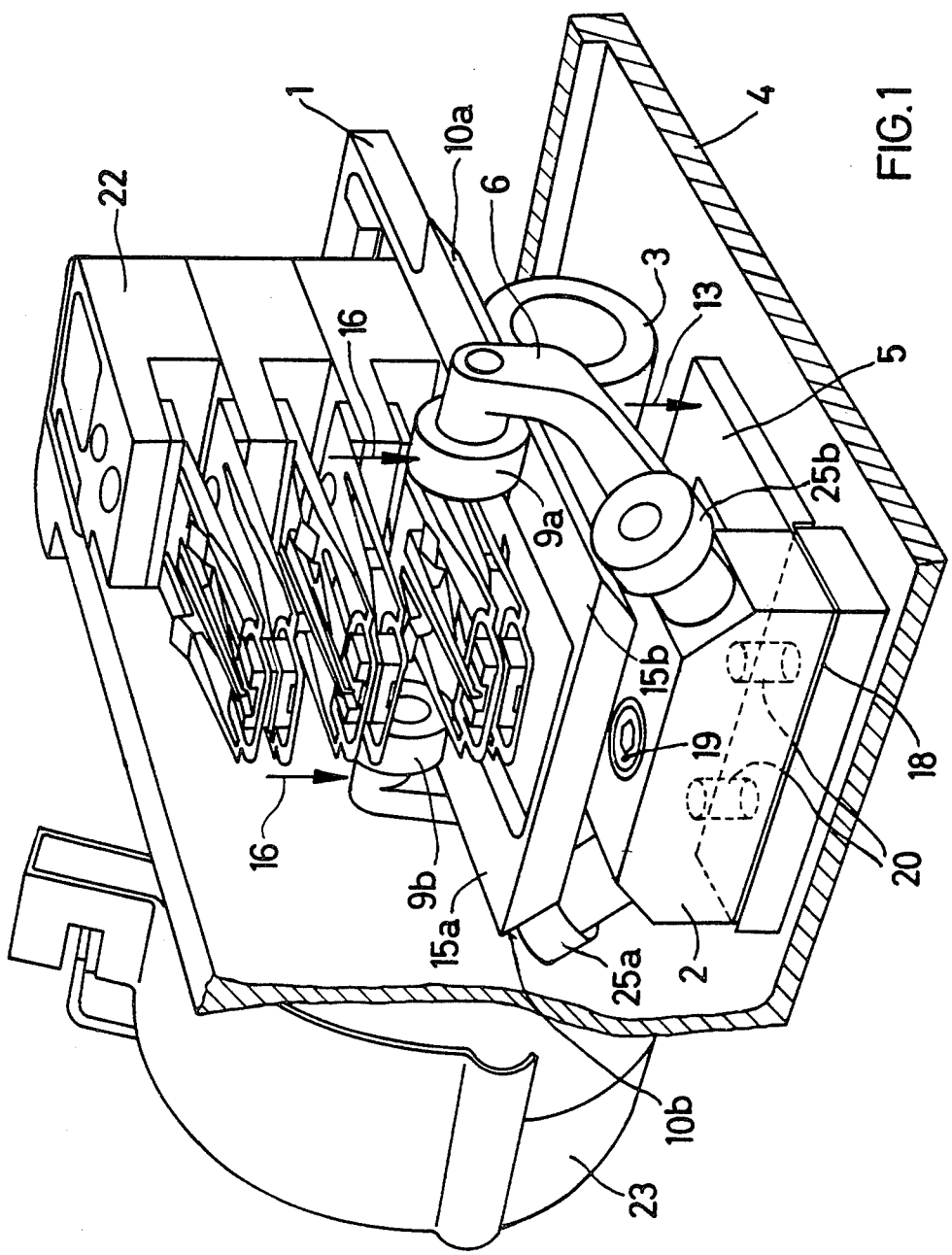

United States Patent [19]

Manzke et al.

[11] Patent Number: 4,475,136
[45] Date of Patent: Oct. 2, 1984

[54] DEVICE FOR POSITIONING OBJECTS WHICH HAVE A LOW MASS

[75] Inventors: Klaus Manzke, Westheim; Ernst-Juergen Grittmann, Ludwigshafen; Volker Koch, Battenberg, all of Fed. Rep. of Germany

[73] Assignee: BASF Aktiengesellschaft, Fed. Rep. of Germany

[21] Appl. No.: 400,048

[22] Filed: Jul. 20, 1982

[30] Foreign Application Priority Data

Jul. 24, 1981 [DE] Fed. Rep. of Germany ....... 3129212

[51] Int. Cl.³ .............................................. G11B 5/55
[52] U.S. Cl. .................................................. 360/106
[58] Field of Search ................ 360/104, 105, 106, 109

[56] References Cited

U.S. PATENT DOCUMENTS

| 2,925,238 | 2/1960 | Lynott | 360/106 |
|---|---|---|---|
| 2,994,856 | 8/1961 | Dickinson | 360/106 |
| 3,124,789 | 3/1964 | Wasylenko | 360/106 |
| 3,470,399 | 9/1969 | Johnson et al. | 360/106 |
| 3,587,075 | 6/1971 | Brown et al. | 360/106 |
| 3,735,163 | 5/1973 | Dijkstra et al. | 310/13 |
| 4,161,004 | 7/1979 | Dalziel | 360/106 |
| 4,418,370 | 11/1983 | Harrison | 360/106 |

Primary Examiner—George G. Stellar
Attorney, Agent, or Firm—Keil & Weinkauf

[57] ABSTRACT

A device for positioning objects which have a low mass, especially for positioning magnetic heads over preselected magnetic tracks on at least one magnetic disk, which can be coupled to a drive, in a memory processing unit, in which a carriage, which is capable of being moved toward and away from the axis of rotation of the magnetic disk, carries at least one magnetic head, this carriage being so mounted between guide elements that it can be displaced by a drive motor longitudinally with respect to the chassis of the unit, wherein the guide elements, in particular pairs of anti-friction bearings, engage either side of the carriage, at least one of the pairs of anti-friction bearings being gimbal-mounted in order to counteract any tilting moments which may act on the carriage. The device advantageously includes a band-type drive mechanism for displacing the carriage, comprising a rotatable cylindrical member around which the band means is wound and which may serve as an additional bearing element. The novel device can be used with advantage in any type of positioning system, especially in any type of system for storing video signals, data signals, audio signals or control signals and having high track densities.

14 Claims, 4 Drawing Figures

DEVICE FOR POSITIONING OBJECTS WHICH HAVE A LOW MASS

The present invention relates to a device for positioning objects which have a low mass, especially for positioning magnetic heads over preselected magnetic tracks on at least one magnetic disk, which can be coupled to a drive, in a memory processing unit, in which a carriage, which is capable of being moved toward and away from the axis of rotation of the magnetic disk, carries at least one magnetic head, this carriage being so mounted between guide elements that it can be displaced by a drive motor longitudinally with respect to the chassis of the unit.

A positioning device of this type can be used advantageously in any signal-storage system in which the signals are recorded at a high track density by, for example, magnetic, electrical or optical means.

U.S. Pat. No. 3,921,933 discloses a tape transport apparatus having two carriage assemblies, in which two pairs of cylindrical rods are mounted on the chassis of the tape transport and serve, in conjunction with commercially available rollers, to guide the carriages. In each case the rollers are rigidly attached to the carriage and therefore constitute part of the mass which has to be moved. A big disadvantage of this type of carriage is that there is essentially point contact between the cylindrical rods and the rollers, this point contact leading, as a result of the high contact pressures involved, to wear of the materials even after only a short period of continuous operation. As a result of this wear, metal particles can be picked up by the recording medium and cause operational disturbances. A further disadvantage is that the rollers must be mounted in a virtually play-free manner in the axial direction, i.e. precisely in the direction in which these rollers exhibit a low load-bearing capacity, in order to keep vertical movement of the carriage relative to the cylindrical guide rods to a minimum. Such a carriage assembly is unsuitable for use in head positioners for disk drives because the vertical position of the carriage and hence of the head supported thereon would alter by precisely this amount of axial play.

U.S. Patent 4,161,004 discloses a head positioning mechanism in which a carriage member, bearing the magnetic heads, is moved by means of a capstan, which is driven by a motor, and by means of a flexible band wound around the capstan. This carriage member is mounted on a guide rod via bushings. In operation, the bushings give rise to sliding friction, which leads to wear of the materials. For the reasons given above, this wear also renders this mechanism unsuitable for use in a disk drive unit, especially one having flying magnetic heads.

The object of the present invention is accordingly to provide a device of the type described at the outset in which the carriage for the magnetic heads is precisely guided in a virtually frictionless manner even when it is subjected to high accelerations and decelerations, and in which carriage wear is greatly reduced in comparison with conventional mechanisms.

This object is achieved, according to the invention, if the guide elements engage the longitudinal edges of the carriage, and at least one pair of the said elements is gimbal-mounted on the chassis of the memory processing unit.

A particularly great advantage of the design according to the invention is that a large number of manufacturing tolerances, e.g. those of the drive motor, the chassis and recording disk, can be compensated for as early as the assembly stage.

In an advantageous embodiment, the carriage is connected to the drive motor via a flexible band and a rotatable cylindrical member, which member also serves as a support for the carriage.

As a result of the very simple design in both instances, the novel positioning device is economical to manufacture and assemble and is distinguished by high positioning accuracy, even at high track densities.

In a further embodiment, the guide elements consist essentially of anti-friction bearings which are in line contact with flat guide surfaces on the carriage.

In a practical embodiment, there are provided anti-friction bearings fixedly mounted on the chassis, and anti-friction bearings gimbal-mounted for movement relative to the chassis.

Advantageously, the fixed anti-friction bearings are in contact with guide surfaces which are inclined at an angle, in particular an angle of 45° C., to the plane of the carriage, and the gimbal-mounted anti-friction bearings are in contact with horizontal guide surfaces. This design provides good stability against any tilting moments which may act on the carriage.

In a further advantageous embodiment, two spaced pairs of fixed anti-friction bearings are provided, and a gimbal-mounted pair of anti-friction bearings is arranged centrally between them. This design has the advantage that the carriage is supported at three points on each of its longitudinal sides.

In order to increase the useful life of conventional components, the flat guide surfaces of the guide plate can be given a special treatment to make them hard-wearing, or provided with a coating or strips of low-wear material.

In a further practical embodiment, the gimbal-mounted pair of anti-friction bearings are located on a bow-shaped member which is mounted in a manner which allows it to move, relative to the chassis of the memory processing unit, about two axes. Owing to its simple design, the bow-shaped member can be manufactured very simply by, for example, injection molding and is very easy to fit, which also applies essentially to the other individual parts of the device according to the invention. For optimum energy utilization, the carriage, the power-transmission mechanism and the drive motor are arranged, relative to each other, in such a manner that the force vector, which acts on the carriage, is essentially located in the plane in which the carriage is displaceably mounted.

In a very advantageous embodiment of the novel device, the gimbal-mounted pair of anti-friction bearings is mounted on a pivotable flexure member and can thus move in the direction in which the flexure member can pivot.

In a further economical embodiment, movement of the bow-shaped member, carrying the pair of anti-friction bearings, in two directions is achieved, on the one hand, by means of a pin and bent-up tabs, which together form a V, and, on the other hand, by means of the flexure member which can only pivot in one direction.

In a further embodiment, freedom from play between the flexure member and the bow-shaped member is ensured by means of springy tabs and the pin, the latter being pulled into the V formed by the bent-up tabs by the prestressing of the flexure member.

In practise, the anti-friction bearings on the bow-shaped member are arranged symmetrically with respect to the pin.

In a further advantageous embodiment, the bow-shaped member is centrally located between the fixed bearings and the rotatable cylindrical member with the drive band, and as a result of it being urged downwards by the prestressed flexure member, exerts a downward force on the carriage via the anti-friction bearings.

If the fixed anti-friction bearings are attached to a stationary bearing carrier, and the gimbal-mounted anti-friction bearings are attached to a gimbal-mounted bow-shaped member, the bearing carrier, the bow-shaped member and the flexure member can be positioned on and jointly fastened to a mounting surface on the chassis of the memory processing unit by means of a single screw and two locking pegs.

Surprisingly easy running of the carriage is achieved by mounting it between anti-friction bearings, at least one pair of which is spring-loaded. The symmetrical assembly of all the guide elements and drive elements, with respect to the direction of motion of the carriage, also prevents the occurrence of any kind of undesirable tilting moment, which can result in wear and in inaccurate positioning of the scanning heads, even when the carriage is subjected to high accelerations and decelerations. In addition, wear of the parts is reduced by the fact that areas of point contact are avoided as a result of the measures according to the invention.

Figure 2:
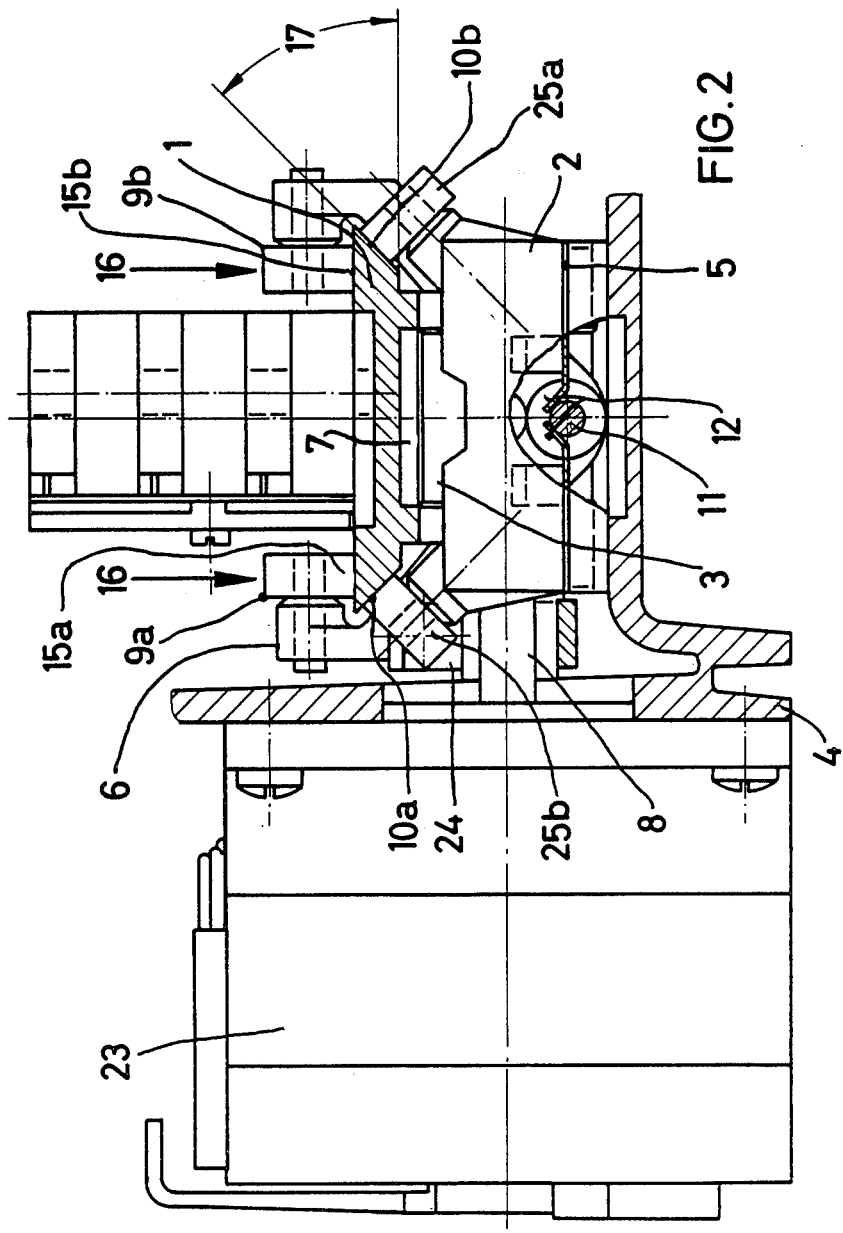
Figure 3:
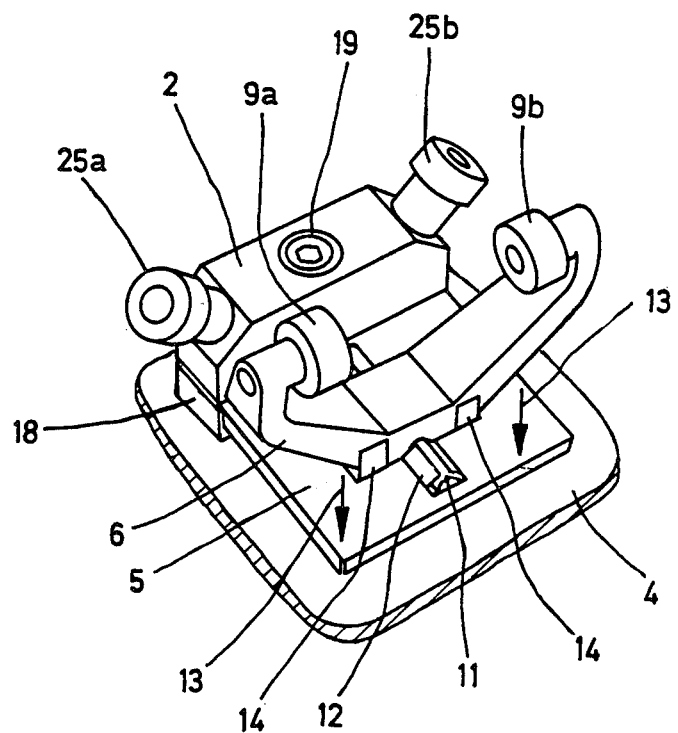
Figure 4:
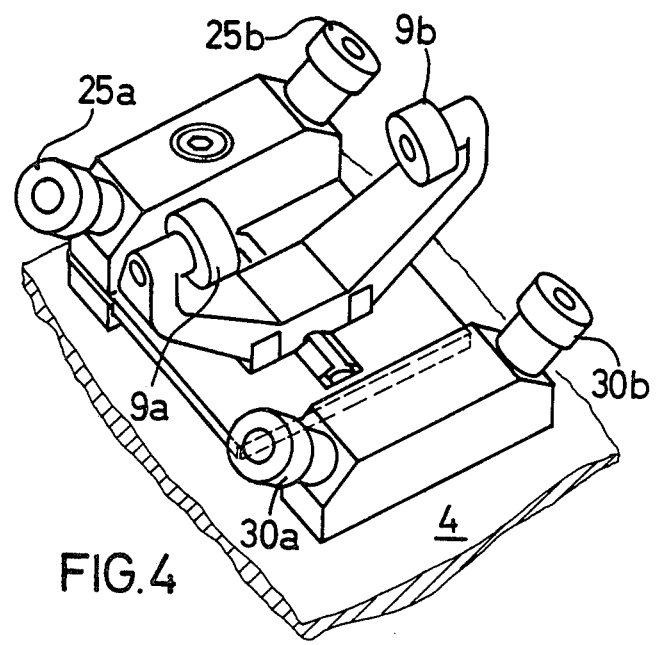

Further details of the invention are disclosed in the following description of the embodiments illustrated in the accompanying drawings, in which FIG. 1 is a schematic perspective view of a positioning device according to the invention for magnetic heads, with the chassis of the memory processing unit in section, FIG. 2 is a schematic front elevation of the device of FIG. 1, partly in section, FIG. 3 is a schematic perspective view of a fixed pair of anti-friction bearings, and of a gimbal-mounted pair of anti-friction bearings, and FIG. 4 shows in perspective view a variant of the bearing arrangement of FIG. 3, comprising an additional pair of fixed anti-friction bearings.

Referring first to FIGS. 1 and 2, motor 23, which is fastened to the chassis 4, carries on its shaft a cylindrical member 3 firmly held in position by means of a clamping element 24. A flexible steel band 7 is wound around the cylindrical member 3, both ends of this band being securely fastened to the carriage 1 bearing the magnetic head assembly 22. It is a big advantage that no spring means of any kind is required for tensioning the steel band, which is inextensible in the longitudinal direction, because the presence thereof would make positioning less accurate. The carriage 1 is supported, at one end, on the periphery of the cylindrical member 3 and, at the other end, by means of anti-friction bearings 25a, 25b on a bearing carrier 2 which, in its turn, is rigidly attached to the chassis 4.

A bow-shaped member 6 is arranged centrally between the cylindrical member 3 and the bearing carrier 2, and presses, via anti-friction bearings 9a, 9b, on the upper guide surfaces 15a, 15b of the carriage 1. The forces applied to either side of the carriage 1, in the direction 16, are produced by means of a prestressed flexure member 5, via which the bow-shaped member 6 is attached to the chassis 4. Moreover, the bow-shaped member 6 is so located, relative to the horizontal plane in which the carriage 1 is displaced, by means of a pin 11, rotatably mounted in the V formed by tabs 12 which are integral with the flexure member 5, that, when the flexure member 5 pivots in the direction indicated by arrows 13, a gimbal mounting is obtained. The bearing carrier 2, the flexure member 5 and the bow-shaped member 6 can be positioned on and jointly fastened to the mounting surface 18 of the chassis 4 by means of only one screw 19 and two locking pegs 20. As can be seen from FIG. 3, freedom from play between the flexure member 5 and the bow-shaped member 6 in the direction of travel of the carriage 1 is ensured by means of sprung tabs 14 which are arranged on either side of the bow-shaped member, while freedom from play at right angles to the direction of travel of the carriage is achieved by virtue of the fact that the pin 11 is drawn into the V formed by the tabs 12 by the prestressing of the flexure member 5.

In a preferred embodiment of the invention, the lateral guide surfaces 10a, 10b of the carriage 1 are inclined at an angle 17 and supported on anti-friction bearings 25a on the bearing carrier 2, and the position of the carriage 1 in the chassis 4 is defined by this bearing arrangement.

FIG. 4 shows a variant of the bearing arrangement of FIG. 3, with two fixed pairs of anti-friction bearings 25a and 25b, and 30a and 30b, and a gimbal-mounted pair of anti-friction bearings 9a and 9b located centrally between them. This design shows that it is not absolutely necessary to use a band drive with a rotatable cylindrical member, but that it is also possible to achieve an exceptional improvement in the mounting and guidance of the carriage, using any type of drive mechanism, e.g. an eccentric drive or a rack-and-pinion drive. The other parts in FIG. 4 correspond to those in FIG. 3.

The arrangement of the above-described pairs of anti-friction bearings, which can in practise be ball bearings, can also, in principle, be reversed, with the fixed bearings on top, and the gimbal-mounted bearings underneath, or the order in which the guide elements are arranged in the direction in which the carriage moves can be reversed.

Due to the manner in which the anti-friction bearings 9a, 9b, 25a, 25b, 30a, 30b are arranged relative to the guide surfaces 15a, 15b, 10b, linear contact between the bearings and the carriage is achieved, as a result of which a considerable reduction in the contact pressure and hence a low-wear guide system are obtained.

In comparison with a conventional positioner (values in brackets) it was possible to obtain the following results with a positioning device according to the present invention:

(1) Positioning time: 1.5 m sec (3 m sec)
(2) Rolling resistance: 10 pond (20-30 p)
(3) Hysteresis: 1-1.5 $\mu$m (3-5 $\mu$m)

For (1), a magnetic disk with a track spacing of 100 $\mu$m and a track width of 60 $\mu$m was used.

For (2), the rolling resistance of the carriage was measured, by means of a spring balance, while applying a force of 1 kp to the carriage, and with the rotor of the drive motor idling—the rolling resistance being a measure of the ease of movement of a system.

For (3), the hysteresis pertaining to movements of the carriage backwards and forwards between two predetermined points was determined by position-comparators forming part of an optical measuring apparatus.

The measured value is the maximum positional discrepancy occurring during a number of positioning operations between the said two points.

To sum up, an improvement by a factor of 2 results, which means that the track density is increased, the energy requirement is halved, and both the access time and the positioning errors are halved. It was also possible, surprisingly, to greatly reduce the tendency of the novel positioning device to oscillate, compared with conventional mechanisms.

While the invention has been particularly shown and described with reference to the foregoing embodiments, it will be understood by those skilled in the art that any similar application of the device according to the invention, where the speed and accuracy of a positioning mechanism are important, and where continuously repeated, identical or similar positioning operations have to be carried out, or any alterations or modifications that may become apparent to the skilled artisan are also intended to be covered by the appended claims.

Accordingly, the novel device can be used in any type of positioning system and especially in any type of system for recording, reproducing and storing any kind of signal, for example video signals, data signals, audio signals and control signals.

We claim:

1. A device for positioning objects which have a low mass, especially for positioning magnetic heads over preselected magnetic tracks on at least one magnetic disk, which can be coupled to a drive, in a memory processing unit, in which a carriage, which is capable of being moved toward and away from the axis of rotation of the magnetic disk, carries at least one magnetic head, this carriage being so mounted between guide elements that it can be displaced by a drive motor longitudinally with respect to the chassis of the unit, wherein the guide elements engage the longitudinal edges of the carriage and at least one pair of the said elements is gimbal-mounted on the chassis of the memory processing unit.

2. A device for positioning objects which have a low mass, especially for positioning magnetic heads over preselected magnetic tracks on at least one magnetic disk, which can be coupled to a drive, in a memory processing unit, in which a carriage, which is capable of being moved toward and away from the axis of rotation of the magnetic disk, carries at least one magnetic head, this carriage being so mounted between guide elements that it can be displaced by a drive motor longitudinally with respect to the chassis of the unit, and being connected to the drive motor via a drive band and a cylindrical member, wherein the guide elements engage the longitudinal edges of the carriage and at least one pair of the said elements is gimbal-mounted on the chassis of the memory processing unit, and the cylindrical member serves as a support for the carriage.

3. A device as claimed in claim 1 or 2, wherein the guide elements consist essentially of anti-friction bearings, which are in line contact with flat guide surfaces on the carriage.

4. A device as claimed in claim 1 or 2, wherein at least one pair of anti-friction bearings is mounted on the chassis via a fixed bearing carrier, and at least one pair of anti-friction bearings is located on a gimbal-mounted bow-shaped member for movement relative to the chassis.

5. A device as claimed in claim 4, wherein the fixed anti-friction bearings are in contact with guide surfaces which are inclined at an angle to the plane of the carriage, and the gimbal-mounted anti-friction bearings are in contact with horizontal guide surfaces.

6. A device as claimed in claim 1 or 2, wherein two spaced pairs of fixed anti-friction bearings are provided, and a gimbal-mounted pair of anti-friction bearings is arranged centrally between them.

7. A device as claimed in claim 3, wherein the flat guide surfaces are provided with low-wear surfaces.

8. A device as claimed in claim 1 or 2, wherein the carriage, the power-transmission mechanism and the drive motor are arranged, relative to each other, in such a manner that the force vector, which acts on the carriage, is essentially located in the plane in which the carriage is displaceably mounted.

9. A device for positioning objects which have a low mass, especially for positioning magnetic heads over preselected magnetic tracks on at least one magnetic disk, which can be coupled to a drive, in a memory processing unit, in which a carriage, which is capable of being moved toward and away from the axis of rotation of the magnetic disk, carries at least one magnetic head, this carriage being so mounted between guide elements that it can be displaced by a drive motor longitudinally with respect to the chassis of the unit, wherein the guide elements engage the longitudinal edges of the carriage and at least one pair of the said elements is gimbal-mounted on the chassis of the memory processing unit, and wherein the guide elements consist of at least one fixed pair of anti-friction bearings, mounted on a stationary carrier, and of at least one pair of anti-friction bearings located on a gimbal-mounted bow-shaped member, the latter being mounted on a flexure member which is capable of pivoting in one direction.

10. A device as claimed in claim 9, wherein movement of the bow-shaped member in two directions is achieved, on the one hand, by means of a pin and bent-up tabs, which together form a V, and, on the other hand, by means of the flexure member which can only pivoz in one direction.

11. A device as claimed in claim 10, wherein freedom from play between the flexure member and the bow-shaped member is ensured by means of sprung tabs and the pin which is pulled into the V formed by the bent-up tabs by the prestressing of the flexure member.

12. A device as claimed in claim 10, wherein the anti-friction bearings on the bow-shaped member are arranged symmetrically with respect to the pin.

13. A device as claimed in claim 9, wherein the pair of anti-friction bearings on the bow-shaped member exerts a downward force on the carriage by virtue of it being supported via the bow-shaped member on the flexure member.

14. A device as claimed in claim 9, wherein the bearing carrier, the bow-shaped member and the flexure member can be positioned on and are jointly attached to a mounting surface on the chassis of the memory processing unit by means of a single screw and two locking pegs.

* * * * *

UNITED STATES PATENT AND TRADEMARK OFFICE
CERTIFICATE OF CORRECTION

PATENT NO. : 4,475,136

DATED : October 2, 1984

INVENTOR(S) : Klaus MANZKE et al.

It is certified that error appears in the above-identified patent and that said Letters Patent is hereby corrected as shown below:

Column 6, line 44, delete "pivoz" and insert --pivot--.

Signed and Sealed this

Fifth Day of November 1985

[SEAL]

Attest:

Attesting Officer

DONALD J. QUIGG

Commissioner of Patents and Trademarks